Patented July 6, 1926.

1,591,590

UNITED STATES PATENT OFFICE.

WILLIAM R. WEBB AND CARL J. MALM, OF ROCHESTER, NEW YORK, ASSIGNORS TO EASTMAN KODAK COMPANY, OF ROCHESTER, NEW YORK, A CORPORATION OF NEW YORK.

PROCESS OF MAKING CELLULOSE ACETATE.

No Drawing. Application filed October 7, 1925. Serial No. 61,144.

This invention relates to processes of making cellulose acetate. One object of the invention is to provide a safe, rapid and easily controlled process which will yield cellulose acetate free from serious degradation. Another object of the invention is to provide a process in which the costs caused by the material being tied up in the plant for a prolonged time are greatly lessened. Other objects will hereinafter appear.

We have found that cellulosic material may be rapidly and safely acetylated, without serious degradation, by treating it with an acetylating bath, the action of which is catalyzed by means of phosphorus and chlorine. Preferably the acetylating bath contains glacial acetic acid and acetic anhydride. Either the yellow or red forms of phosphorus may be employed. But because of the intensity with which chlorine acts with yellow phosphorus, because of the danger of degrading the product by the consequent rapid evolution of heat when yellow phosphorus is used, because of the hazard to the employees when yellow phosphorus is used, and because of the expenses of refrigeration which is desirable to control the action of the yellow phosphorus, we greatly prefer to employ red phosphorus. This does not produce a harmful evolution of heat, when acting with the chlorine, but the operation is under adequate control and yet induces acetylation of the cellulosic materials at a surprisingly rapid rate.

We have found that the introduction of the phosphorus and chlorine into the acetylating mixture before they have combined with each other induces a much stronger catalytic action than do chlorinated compounds of phosphorus under parallel conditions. Some of the compounds of phosphorus and chlorine have been found to have practically no catalyzing action with respect to the acetylating of the cellulose and cause the production of a badly degraded material,—that is, one in which the cellulosic molecule is badly broken down. We have found in some examples that red phosphorus and chlorine, when introduced uncombined into the acetylating mixture bring about acetylation in one-fourth to one-sixth of the time required when phosphorus pentachloride is employed as the catalyst. Evidently when the phosphorus and chlorine act on each other in the acetylating bath, they produce an active compound in a nascent or especially reactive condition.

We shall now describe the preferred form of our invention by way of example, but it will be understood that the invention is not limited to the details, thus given, except as indicated in the appended claims. An acetylating bath is prepared by mixing 500 parts of glacial acetic acid and 600 parts of acetic anhydride. This is mixed with 100 parts of the cellulosic material, which may be any of the materials customarily used in the manufacture of cellulose acetate, such as cotton, tissue paper, wood pulp, etc. We have found that 100 parts of clean cotton are especially useful in producing a high-grade product. Into the mixture of cotton and the acetylating bath there is stirred from 1 to 10 (say 4 parts) of red phosphorus. This should be distributed with uniformity throughout the reaction mass. The latter is preferably kept at a temperature sufficiently low to prevent the degradation of the cellulose acetate, which is being produced. We have found 60 to 65° C. to be a safe working temperature by way of illustration.

With the reaction mixture, containing the red phosphorus, at the proper temperature, we pass in gaseous chlorine by bubbling it up through the mass, preferably with agitation of the latter. The chlorine may be forced in so as to itself cause this agitation, or the action of the chlorine may be supplemented by a mechanical stirring mechanism. Chlorine is passed in until it ceases to be absorbed,—that is, until the bath is saturated with it, as indicated by the evolution or increased evolution of chlorine bubbles at the upper surface.

The cotton gradually goes into solution, as the cellulose acetate is formed, and eventually a clear solution will be obtained. When operating at the temperatures and with the proportions given above, the acetylation of cotton linters, in a typical example, has been found to be completed within the comparatively short time of five or six hours. Because of the rapidity of the reaction, under the influence of our catalysts, we largely avoid the degradation of the cellulose acetate product which takes place when slower acting baths subject the materials to deleterious agents for longer periods.

In the example given above, the cotton is added to the bath before the chlorine. We have found, however, that the process works very well when the chlorine is added before the cotton,—that is, when the red phosphorus, preferably in finely divided form, is stirred into the acetylating bath so as to be suspended homogeneously therein and then chlorine bubbled into the bath until the latter is saturated. When cotton is added to this bath, loaded with the catalyzers, it acetylates very quickly.

After the transparent solution of cellulose acetate is obtained, the subsequent treatment of the materials follows the known practice. The cellulose acetate may be hydrolized to the desired extent, for the production of solubility in specific desired organic solvents. The acetic values may be recovered by evaporation and condensation, or by solution and concentration. Moreover, in the recovery treatment the cellulose acetate may be spread in the form of films or brought into the form of powder by stirring or spraying, as set forth in the prior art. It is one of the results of our process that the product is highly free from objectionable color.

Having thus described our invention, what we claim as new and desire to secure by Letters Patent is:—

1. The process of making cellulose acetate which comprises treating cellulosic material with an acetylating bath and catalyzing the reaction with phosphorus and chlorine.

2. The process of making cellulose acetate which comprises treating cellulosic material with acetic anhydride and acetic acid in the presence of red phosphorus and chlorine as catalyzers.

3. The process of making cellulose acetate which comprises distributing red phosphorus homogeneously through an acetylating bath containing acetic anhydride and acetic acid, and treating cellulosic material in said bath in the presence of chlorine until cellulose acetate is produced.

4. The process of making cellulose acetate which comprises mixing cotton with acetic acid and acetic anhydride, distributing red phosphorus, equal to 1 to 10% of the weight of the cellulose, homogenously throughout said mixture, saturating the mixture with chlorine, and conducting the reaction at 60 to 65° C.

Signed at Rochester, New York, this 30th day of September, 1925.

WILLIAM R. WEBB.
CARL J. MALM.